United States Patent [19]

Bornhorst et al.

[11] 4,430,782

[45] Feb. 14, 1984

[54] APPARATUS AND METHOD FOR BURNISHING MAGNETIC DISKS

[75] Inventors: Randy J. Bornhorst; Arlen J. Bowen, both of Rochester, Minn.

[73] Assignee: International Business Machines Corporation, Armonk, N.Y.

[21] Appl. No.: 338,689

[22] Filed: Jan. 11, 1982

[51] Int. Cl.³ .......................... B24B 39/00; B24B 7/04
[52] U.S. Cl. ...................................... 29/90 R; 51/132
[58] Field of Search ......................... 51/132; 29/90 R

[56] References Cited

U.S. PATENT DOCUMENTS

| | | | |
|---|---|---|---|
| 3,486,274 | 12/1969 | David | 51/132 |
| 3,568,371 | 3/1971 | Day et al. | 51/132 |
| 3,601,932 | 8/1971 | Elliott et al. | 51/132 |
| 3,943,666 | 3/1976 | Dion et al. | 51/132 |
| 4,179,852 | 12/1979 | Barnett | 51/132 |
| 4,330,910 | 5/1982 | Schachl et al. | 29/90 R |

Primary Examiner—Leonidas Vlachos
Assistant Examiner—Jerry Kearns
Attorney, Agent, or Firm—Robert W. Lahtinen

[57] ABSTRACT

The burnishing tool has a plurality of holes in the planar surface which engages the flexible magnetic disk. Each hole contains a burnishing blade positioned at 45° to the direction of motion. A manifold connects each hole to a vacuum pump which draws air into the holes causing the flexible magnetic disk to fly against the planar surface. The vacuum also removes the debris from the burnishing tool.

10 Claims, 8 Drawing Figures

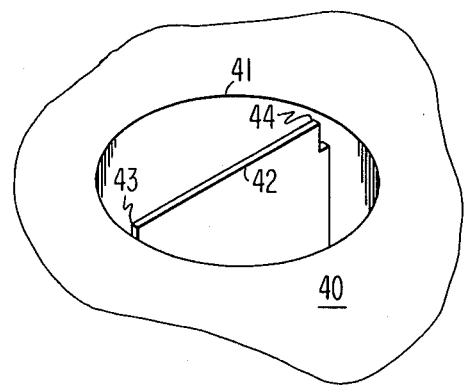
FIG. 5
FIG. 6
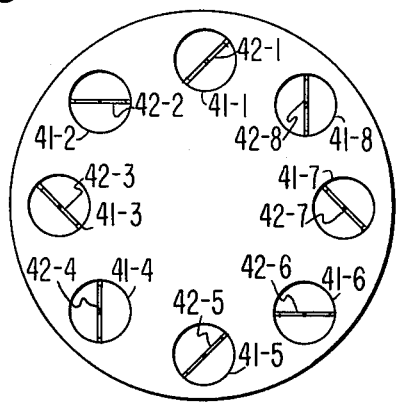
FIG. 7
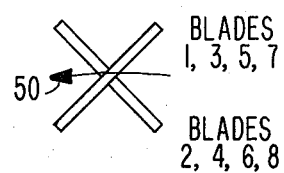
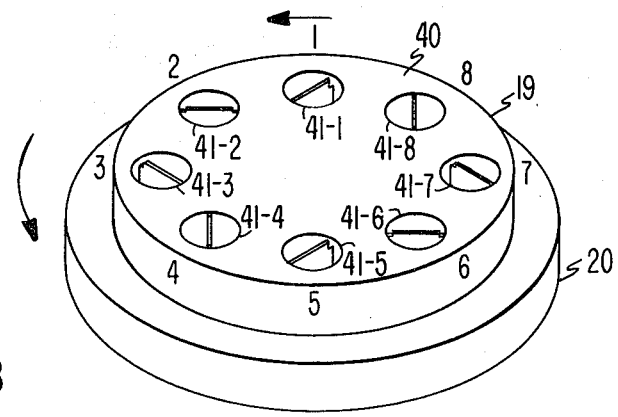
FIG. 8

APPARATUS AND METHOD FOR BURNISHING MAGNETIC DISKS

TECHNICAL FIELD

Various burnishing techniques have been used to finish the surface of flexible magnetic disks. In most cases these techniques have been adequate although available diskettes have a wide range of surface finishes. There is, however, a requirement for ever increasing bit density which cannot be satisfied with existing coatings. It has been found that simply improving existing coatings with more burnishing to provide a smoother finish is not adequate and an improved coating is necessary. Unfortunately, the existing burnishing techniques are not adequate to handle the improved coatings which have much improved smoothness. Smearing of asperities, embedding debris and removal of particles, causing voids, are common faults of existing techniques when applied to improved, smoother, coatings. The improved surface needs only to have the occasional large asperity removed to eliminate readback defects. A further problem exists in the time required to burnish a disk. While some techniques provide adequate surface finish on existing media from a 20 to 40 second burnish, a more desirable figure is 2-4 seconds. In other words, to be a satisfactory technique, the burnishing of improved media should be able to be completed in 2-4 seconds. In addition to all this, the new technique should not require exotic technology or equipment but should resemble the existing burnishing process as much as possible to make it easy to implement in existing manufacturing sites with minimum retraining of machine operators.

BACKGROUND ART

The surface quality of a flexible magnetic disk as measured by the error free reproduction of recorded data can be substantially improved by mechanically treating the disk surface. The desirability of surface treatment and its advantages were recognized when it was discovered that untreated disk surfaces had reduced errors after they had been used for a period of time. There was rapid improvement for an initial period of use. After this, the disk remained essentially unchanged until the effect of mechanical wear became evident. Following this discovery, efforts were made to speed up the break-in period since it was not practical to run the disks in normal fashion for the time required to improve their performance.

The various disk manufacturers use a variety of techniques, not all of which are publicly known. Examples of surface treatment are shown in U.S. Pat. Nos. 3,943,666 and 4,179,852 and IBM Technical Disclosure Bulletin Vol. 14, No. 5, October 1971 pages 1144-1146; Vol. 19, No. 10, March 1977 pages 3829-3830 and Vol. 20, No. 3, August 1977 pages 1146-1147.

These techniques are variously referred to as burnishing, polishing or honing but the objective, removal of asperities to improve the smoothness of the disk, is the same regardless of the name applied to the technique.

U.S. Pat. No. 3,943,666 describes a process which uses an abrasive cylinder to burnish a flexible disk supported against a resilient backing plate. The surface deviation finish claimed for this process is 1.8 AA in a 12-22 second treatment. While surface finish dimensions are a factor, the real test is how the disk performs in actual practice. Even a very smooth finish may not perform well if the finish is obtained by a process which creates voids in the recording media.

U.S. Pat. No. 4,179,852 uses an abrasive loaded pad to polish a flexible disk. While the patent does not describe the quality of the surface finish obtained, it does specify a burnishing period of approximately 20 seconds.

U.S. Pat. No. 3,486,274 describes an apparatus for grinding the surface of a rigid disk. The metallic grinding pads are fastened to a rotating head in a fashion which permits them to conform to the undulations in the rigid disk. The grinding pads have slots of varying widths according to their distance from the center of the rotating head. Nothing is said concerning the ability to finish flexible disks.

IBM Technical Disclosure Bulletin Vol. 14, No. 5, pages 1444-5 shows a flexible disk surface treatment which uses a sharp flat hard blade which bears against a flexible disk in a region backed by a resilient pad. The treatment is specified to take 20 seconds.

IBM Technical Disclosure Bulletin, Vol. 19, No. 10, pages 3829-30 illustrates a burnishing process which typifies the prior art. A cup type burnishing tool is positioned within a hole in a flat Bernoulli plate which supports a rotating flexible disk. The edge of the cup forms a circular knife which engages the disk and smoothes out any high spots or bumps. The flow of air outwardly across the knife edge burnishing cup appears to create an area of reduced pressure within the cup to draw the flexible disk into engagement with the cup.

IBM Technical Disclosure Bulletin, Vol. 20, No. 3, August 1977, pages 1146-7 sets forth an improved version of the process described in Vol. 19. The improvement consists of a vacuum applied to the interior of the burnishing tool and a change to a rounded edge on the tool instead of the sharp edge previously described. This improvement is directed specifically to media which uses chromium dioxide coatings.

From the wide range of processes described above it can be seen that the treatment is more of an art than a science. Where one process uses a sharp edged tool another uses a round edge. Some processes use abrasives either bonded to a tool or in a slurry and others use only a tool. Suffice to say that what works for one media is often not satisfactory for another or at least does not produce an optimum result.

DISCLOSURE OF THE INVENTION

The principal object of the invention is to provide an improved method and apparatus for burnishing flexible magnetic disks having an improved surface coating which cannot be satisfactorily burnished with existing equipment and techniques. Flexible disks having a chromium dioxide coating are particularly suited to this technique. The apparatus includes a burnishing tool having multiple blades positioned in individual holes. The holes are connected to a plenum. The tool is rotated over the flexible disk which is also rotated. A vacuum is applied to the plenum causing the flexible disk to fly at a fixed distance from the surface of the burnishing tool. The vacuum also serves to remove the material that is dislodged from the surface of the disk by the burnishing process. The burnishing blades are spaced from the wall of the hole to prevent material removed from the disk from becoming lodged in the corner where it could cause scratches and interfere with the burnishing process. The orientation of the burnishing blades is selected to ensure that each area of the flexible disk is treated by blades which are different angles with respect to the surface.

BRIEF DESCRIPTION OF THE DRAWINGS

FIG. 5 is a partial perspective view showing a burnishing blade and the notches at the ends of the blade.

FIG. 6 is a bottom view of the burnishing tool.

FIG. 7 shows the orientation of the burnishing blades.

FIG. 8 is a perspective view of the burnishing tool and manifold.

BEST MODE FOR CARRYING OUT THE INVENTION

Figure 1:
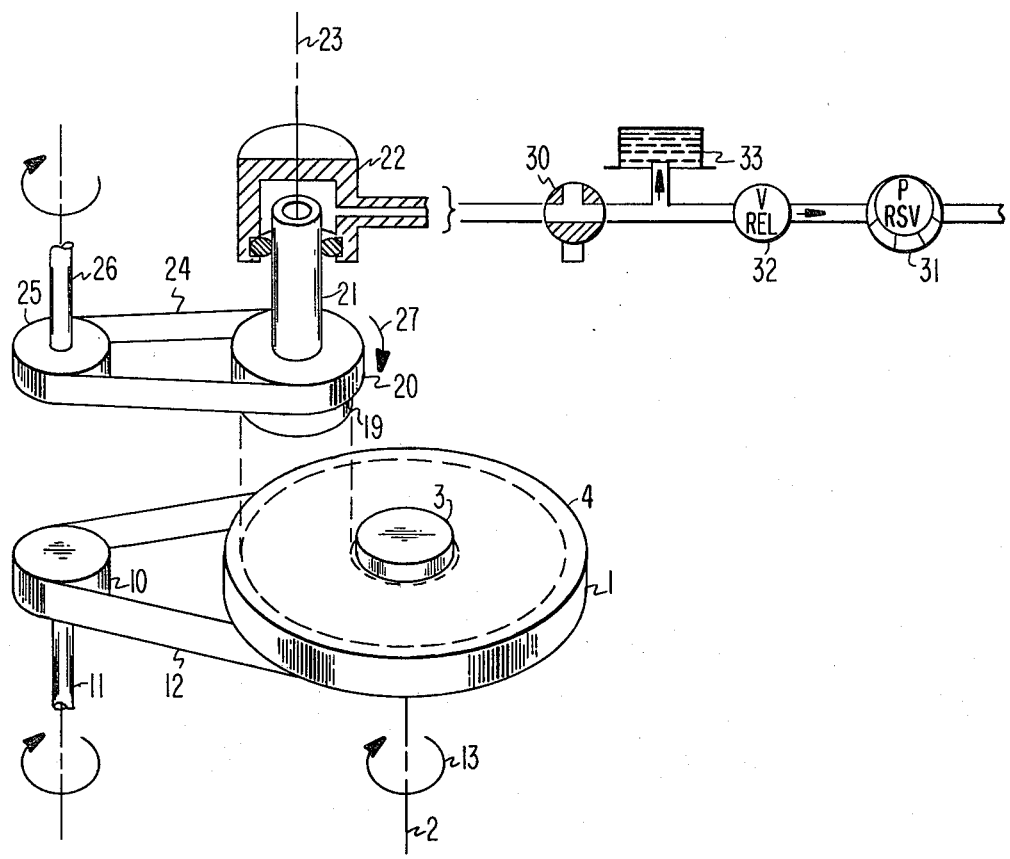
FIG. 1 is a schematic drawing of the basic apparatus used to practice the invention.

The flexible disk surface finishing system shown in FIG. 1 has a flexible disk support platter 1 suitably mounted for rotation about a first axis 2. A hub 3, located at the center of platter 1, positions and clamps flexible disk 4 on platter 1 so that disk 4 rotates at the same speed as platter 1. Hub 3 can be an expandable collet, or a flange type clamp operated by air, electrical or mechanical means. Precise centering is not required but no slippage between the disk 4 and platter 1 should occur during the finishing process.

Platter 1 can be driven by any suitable means such as drive pulley 10, mounted on drive shaft 11, and belt 12. Shaft 11 is driven by means which provides precise control of the rotational speed. In the preferred embodiment the platter 1 is in the direction of arrow 13 at 1658 revolutions per minute and controlled within ±2 revolutions per minute. A synchronous motor or stepping motor energized by a source of energy at the appropriate frequency is a preferred drive means for shaft 11.

A burnishing tool 19 including a manifold 20 is positioned above the platter 1. Manifold 20 is mounted on hollow shaft 21 which rotates within the sealed bearing assembly 22. Burnishing tool 19 and manifold 20 are rotated about axis 23 by means of belt 24 and drive pulley 25 on shaft 26. The burnishing tool is rotated in the direction of arrow 27 at a speed of 1650 revolutions per minute and controlled within ±2 revolutions per minute.

The manifold 20 is mounted so that it may be lowered to within 0.010" of flexible disk 4. When in this position, valve 30 is rotated from a position which vents the manifold to the atmosphere to the position shown in FIG. 1. This applies a vacuum, generated by vacuum pump 31, to the manifold 20. The vacuum system includes a relief valve 32 and reservoir 33.

Figure 2:
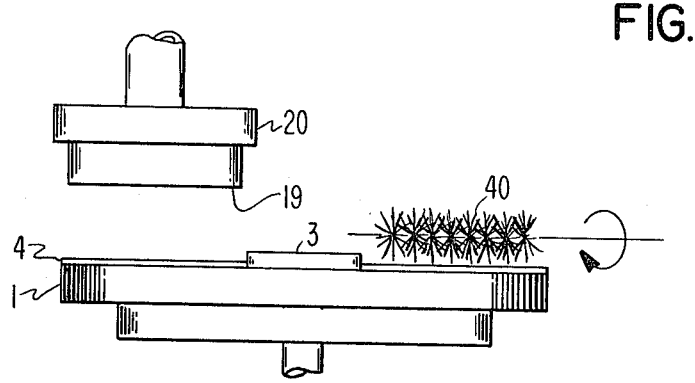
FIG. 2 is a partial side view of the burnishing tool and the platter used to rotate the flexible disk.

The relationship between burnishing tool 19 and disk 4 prior to the finishing is shown in FIG. 2. Burnishing tool 19 is spaced well away from platter 1 to allow disk 4 to be placed in position and clamped to platter 1 by hub 3. In order to remove such loose particles as may exist on the disk surface, a brush 39, rotating in the direction of arrow 41, may be lowered into engagement with flexible disk 4.

Figure 3:
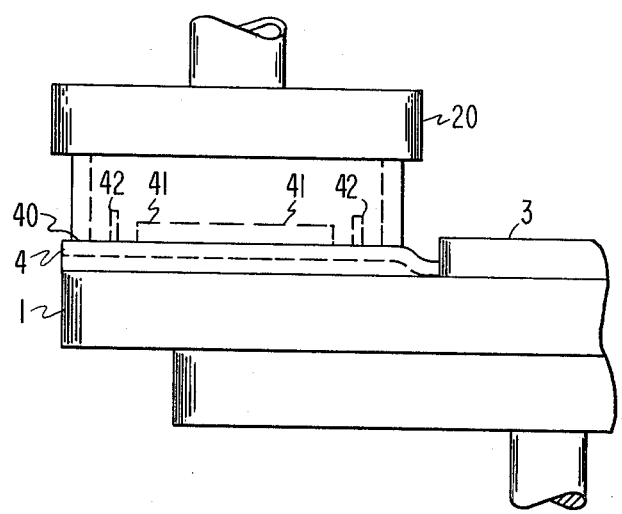
FIG. 3 is an enlarged portion of the burnishing tool and platter of FIG. 2 showing the tool in the operative position.
Figure 4:
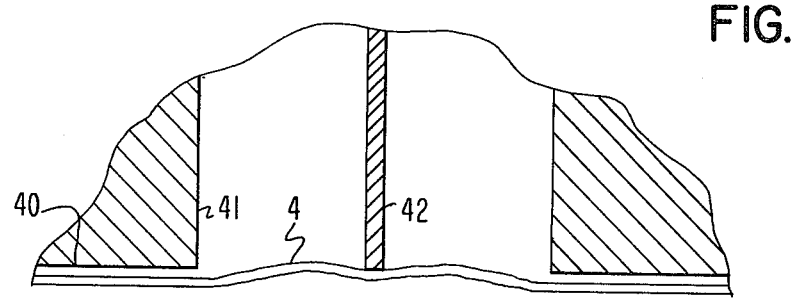
FIG. 4 is a partial sectional view taken through a burnishing blade and a flexible disk.

After this treatment with brush 39 the burnishing tool 19 is moved to the position shown in FIG. 3 which places the lower, planar, surface 40 of manifold 20 approximately 0.010" disk 4. When valve 30 is moved to the position shown in FIG. 1, the resulting air flow between disk 4 and planar surface 40 into the openings 41 causes flexible disk 4 to fly against planar surface 40 as shown in FIG. 4. In the area of the planar surface 40 the disk 4 will fly at a height greater than the average coating roughness, but less than the height of the troublesome asperities. However, in the area of holes 41, the flexible disk 4 bows slightly upward and comes into engagement with burnishing blade 42. The engagement is primarily a function of the mechanical properties of the flexible disk 4, the air flow between disk 4 and planar surface 40, the amount of vacuum, and the size of hole 41. Other factors are less significant.

The burnishing blade 42 engages flexible disk 4 at right angles so that the blade tends to wear sharp. This is significant to blade life and the performance of the system. A sharp blade tends to reduce smearing of asperities. Smearing is undesirable because, among other disadvantages, it reduces the sites available for lubricant retention. Smearing also tends to aggravate the transfer of asperities from the media to the recording transducer where they adhere and cause an increase in the head to disk spacing. Thus, a smoother finish, if produced by smearing, may not result in improved performance.

The physical arrangement of burnishing blades 42 and holes 40 is shown in greater detail in FIGS. 5-8. The shape of blade 42 is shown in FIG. 5. The ends 43 and 44 are spaced away from the wall of hole 41. The distance between the ends 43 and 44 and the wall is selected to prevent debris removed from the disk 4 from becoming wedged between the blade 42 and the wall. This distance depends largely on the size of the debris generated during the burnishing process and will be determined experimentally in most cases. A selected dimension can be used in a trial run. If the corners become filled, a larger dimension can be tried. Although the drawing is not made to scale it does illustrate an approximation for the gap. A distance one to three times the blade thickness is a good starting point. Further, if too large a gap is used the ends 43 and 44 may score the surface of disk 4 although this is not a problem with acceptable gaps.

FIG. 6 shows the arrangement of the holes 41 in the planar surface 40. In the preferred embodiment eight holes 41 and blades 42 are used. These are spaced at regular intervals along a circular path equidistant from the axis of rotation. It is desirable to have the diameter of the circular area encompassed by the blades to be slightly greater than the radial region to be burnished on the disk. This allows a disk to be burnished without the need for radial translation of burnishing tool 19.

Each of the blades 42-1 through 42-8 is positioned at 45° with respect to the direction of rotation. It has been found that improved burnishing results if the blades are so arranged. Although the reason for this is not entirely clear it may be due to reduced smearing of asperities. An additional improvement is provided by positioning alternate blades at 90°, still at 45° with respect to the direction of rotation, but canted in the other direction. This arrangement is shown in FIG. 7 where the leading edges of blades 1, 3, 5 and 7 lie 45° to the left of the direction of rotation shown by arrow 50. The leading edges of blades 2, 4, 6 and 8 lie 45° to the right of arrow 50. Thus, when a surface imperfection is encountered, blade 1 tends to shear it to the right, blade 2 tends to shear it to the left, etc. This arrangement has been effective in reducing the smearing of such imperfections when the tool or tools move in the same path at the same angle with respect to the disk.

The front perspective view of FIG. 8 shows the planar surface 40 of burnishing tool 19 and the blades 42 arranged in the holes 41. Each of the holes 41-1 through 41-8 communicates with the hollow interior of manifold 20. This arrangement is shown in FIG. 3. The blades 42 may be individually fabricated, mounted in holes 41 and then ground flush with planar surface 40. It has been found preferable to fashion the blades and the manifold from a single piece of tool steel. The holes 41 and blades 42 can be fabricated by means of conventional electro discharge machining or chemical etching. The planar surface 40 is finished in the usual fashion by grinding, lapping, and polishing to a mirror-like finish.

We claim:

1. Apparatus for finishing the surface of a flexible magnetic disk comprising;
    first drive means for rotating a flexible disk about a first axis perpendicular to the plane of said disk,
    a manifold rotatable about a second axis parallel to and spaced from said first axis,
    said manifold having a planar surface perpendicular to said second axis,
    a plurality of openings in said planar surface
    a burnishing blade mounted in at least one of said openings with a blade edge positioned substantially coplanar with said manifold planar surface, the ends of said blade edge being spaced from the wall of said openings,
    means for applying a vacuum to said manifold to draw a flexible disk toward said manifold planar surface, and
    second drive means for rotating said manifold about said second axis.
2. Apparatus according to claim 1 wherein
    means for controlling the speed of said first and second drive means to cause the rotational speed of said manifold to differ from the rotational speed of said disk.
3. Apparatus according to claim 2 wherein
    the rotational speed of said manifold is 1650 RPM±2 RPM and the rotational speed of said disk is 1658 RPM±2 RPM.
4. Apparatus according to claim 1 wherein
    the diameter of said planar surface is greater than the radial length of the area to be burnished.
5. Apparatus according to claim 1 wherein
    the distance between said first and second axes remains constant during burnishing.
6. Apparatus according to claim 1 wherein
    said openings are arranged equidistant from said second axis.
7. Apparatus according to claim 1 wherein
    the area of said openings is approximately 33% of the area of said planar surface.
8. Apparatus according to claim 1 wherein
    the gauge vacuum within said manifold during operation is 9 inches of mercury (±1).
9. A process for treating the surface of a flexible magnetic disk comprising the steps of:
    1. Rotating the disk at a first speed,
    2. Rotating a manifold, having burnishing blades positioned in holes in a planar surface, at a second, different speed,
    3. Applying a vacuum to said manifold to cause said disk to fly against said planar surface and engage said burnishing blades,
    4. Discharging said vacuum to disengage said disk from said manifold surface when the treatment is complete.
10. A process according to claim 9 wherein
    step 3 lasts at least 2 seconds and not more than 5 seconds.

* * * * *